(12) United States Patent
Ojima et al.

(10) Patent No.: US 11,749,871 B2
(45) Date of Patent: Sep. 5, 2023

(54) BATTERY MODULE AND BATTERY PACK

(71) Applicant: VEHICLE ENERGY JAPAN INC., Hitachinaka (JP)

(72) Inventors: Kazunori Ojima, Hitachinaka (JP); Sadayuki Aoki, Hitachinaka (JP); Osamu Kubota, Hitachinaka (JP); Yoshitaka Watahiki, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 37 days.

(21) Appl. No.: 17/058,710

(22) PCT Filed: Mar. 1, 2019

(86) PCT No.: PCT/JP2019/008075
§ 371 (c)(1),
(2) Date: Nov. 25, 2020

(87) PCT Pub. No.: WO2019/244412
PCT Pub. Date: Dec. 26, 2019

(65) Prior Publication Data
US 2021/0210826 A1 Jul. 8, 2021

(30) Foreign Application Priority Data
Jun. 20, 2018 (JP) .................. 2018-117222

(51) Int. Cl.
*H01M 50/50* (2021.01)
*H01M 50/583* (2021.01)
(Continued)

(52) U.S. Cl.
CPC ....... *H01M 50/583* (2021.01); *H01M 50/209* (2021.01); *H01M 50/296* (2021.01); *H01M 50/50* (2021.01); *H01M 2220/20* (2013.01)

(58) Field of Classification Search
CPC .... H01M 50/58; H01M 50/583; H01M 10/50; H01M 50/10; H01M 50/20
See application file for complete search history.

(56) References Cited

U.S. PATENT DOCUMENTS

| 2008/0238370 A1* | 10/2008 | Carrier ................. H01M 50/20 |
| | | 320/136 |
| 2012/0030932 A1* | 2/2012 | Hermann ............ H01M 50/572 |
| | | 29/623.1 |

(Continued)

FOREIGN PATENT DOCUMENTS

| CN | 106104857 A | 11/2016 |
| EP | 2793291 A2 | 10/2014 |

(Continued)

OTHER PUBLICATIONS

Extended European Search Report dated Feb. 18, 2022 for European Patent Application No. 19821834.9.

(Continued)

*Primary Examiner* — Kenneth J Douyette
(74) *Attorney, Agent, or Firm* — Volpe Koenig

(57) ABSTRACT

The present disclosure provides a battery module having more improved safety than the conventional battery pack and capable of protecting the battery cells more reliably. The current value at which a cell blocking portion CB inside each of a plurality of battery cells BC interrupts a current path inside the battery cell BC is larger than the current value at which the module fuse MF connected in series to the module terminals MT and the plurality of battery cells BC blows out.

10 Claims, 11 Drawing Sheets

(51) Int. Cl.
    *H01M 50/296*     (2021.01)
    *H01M 50/209*     (2021.01)

(56) References Cited

U.S. PATENT DOCUMENTS

| | | |
|---|---|---|
| 2012/0261206 A1* | 10/2012 | Yasui ................ H01M 50/20 180/274 |
| 2013/0095356 A1* | 4/2013 | Shimizu ............ H01M 50/317 429/88 |
| 2014/0315051 A1 | 10/2014 | Han et al. |
| 2014/0377601 A1 | 12/2014 | Kim |
| 2015/0243957 A1 | 8/2015 | Han et al. |
| 2017/0077484 A1 | 3/2017 | Li et al. |

FOREIGN PATENT DOCUMENTS

| | | |
|---|---|---|
| JP | 2002-216743 A | 8/2002 |
| JP | 2012-150902 A | 8/2012 |
| JP | 2014-022285 A | 2/2014 |
| JP | 2015-005492 A | 1/2015 |
| JP | 2015-022959 A | 2/2015 |
| JP | 2016-009627 A | 1/2016 |
| JP | 2016-096014 A | 5/2016 |

OTHER PUBLICATIONS

Chinese Office Action dated Jun. 20, 2022 for Chinese Patent Application No. 201980035482.5.

* cited by examiner

BATTERY MODULE AND BATTERY PACK

TECHNICAL FIELD

The present disclosure relates to a battery module including a plurality of battery cells, and a battery pack including the battery module.

BACKGROUND ART

Conventionally inventions about a battery pack have been known, the battery pack having an assembled battery fuse connected to battery cells and a battery pack fuse connected to a battery unit, and the battery pack fuse has a constant set so that the battery pack fuse blows out faster than the assembled battery fuse (see Patent Literature 1). The invention described in Patent Literature 1 relates to a battery pack to be mounted on a vehicle, including the battery unit and the battery pack fuse, and has the following configuration (see the document, claim 1, for example).

The battery unit includes a plurality of assembled batteries each having battery cells and an assembled battery fuse connected in series to the battery cells. The battery pack fuse is connected in series to the battery unit, and has a constant set so as to blow out faster than the assembled battery fuse when a current exceeding the rating flows through the battery unit. The battery pack fuse is placed above the battery unit in the vertical direction.

With this configuration, the battery pack fuse is placed outside the case, and so a user does not have to remove a part of the case or do the work in the limited space inside the case, and so replaces the battery pack fuse easily (see the document, paragraph 0008, for example). This conventional battery pack therefore allows a user to easily replace the battery pack fuse connected in series to the battery unit (see this document, paragraph 0015, for example).

CITATION LIST

Patent Literature

Patent Literature 1 JP 2015-022959 A

SUMMARY OF INVENTION

Technical Problem

To meet higher safety standards for battery packs, highly safety and more reliable protection of battery cells are required. The present disclosure provides a battery module having more improved safety than in the conventional battery pack and capable of protecting the battery cells more reliably, and provides a battery pack including the battery module.

Solution to Problem

One aspect of the present disclosure is a battery module including: a plurality of battery cells; a cell blocking portion in a current path inside each of the plurality of battery cells, the cell blocking portion being configured to interrupt the current path in response to a current of a predetermined current value or higher flowing through the current path; a pair of module terminals connected to the plurality of battery cells; and a module fuse connected in series to the pair of module terminals and the plurality of battery cells. A current value at which the cell blocking portion interrupts the current path is larger than a current value at which the module fuse blows out.

Advantageous Effects of Invention

The one aspect of the present disclosure provides a battery module having more improved safety than in the conventional battery pack and capable of protecting the battery cells more reliably, and provides a battery pack including the battery module.

DESCRIPTION OF EMBODIMENTS

The following describes one embodiment of a battery module and a battery pack including the battery module according to the present disclosure with reference to the drawings.

Figure 1:
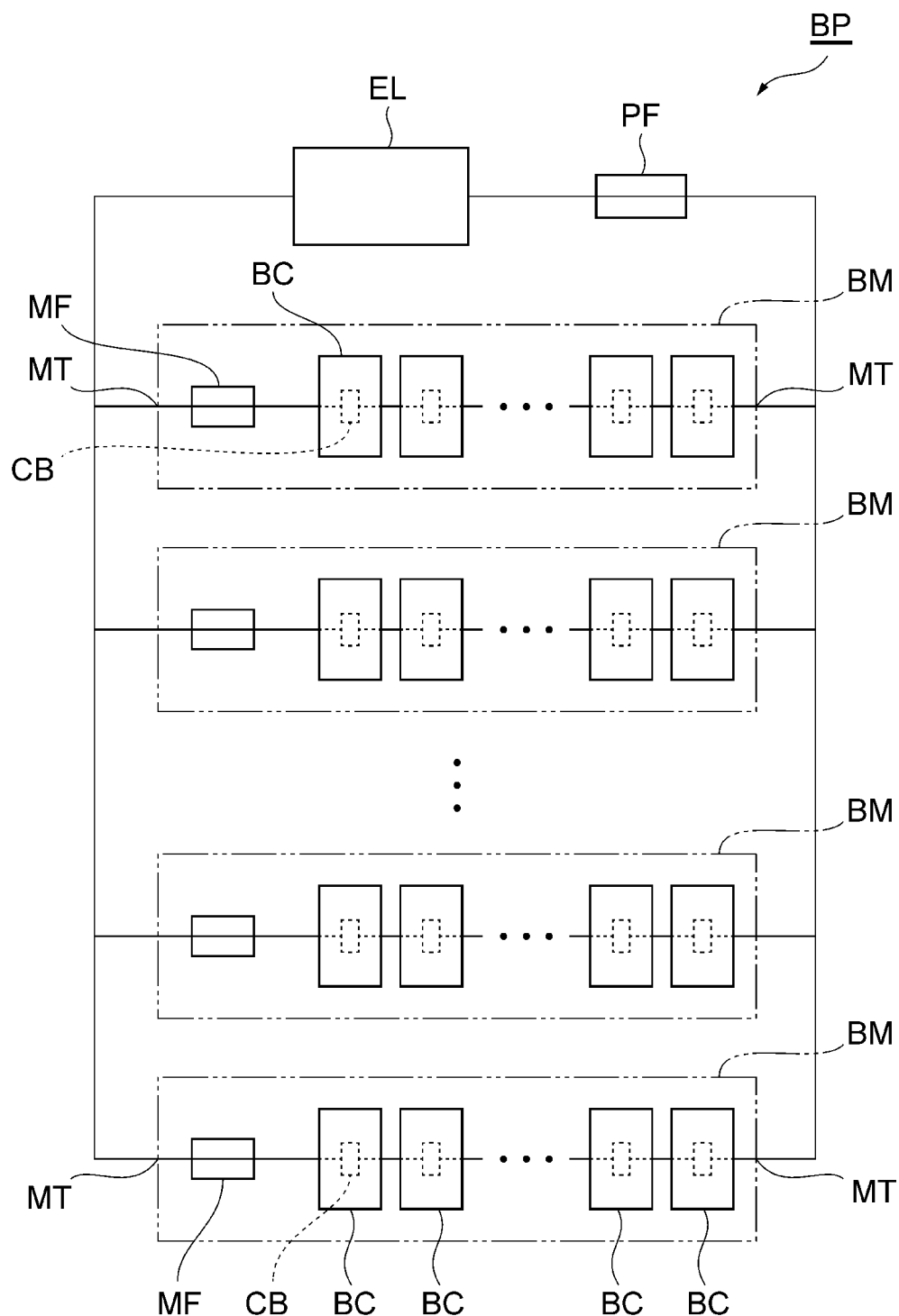
FIG. 1 is a schematic circuit diagram of a battery pack according to one embodiment of the present disclosure.
Figure 2:
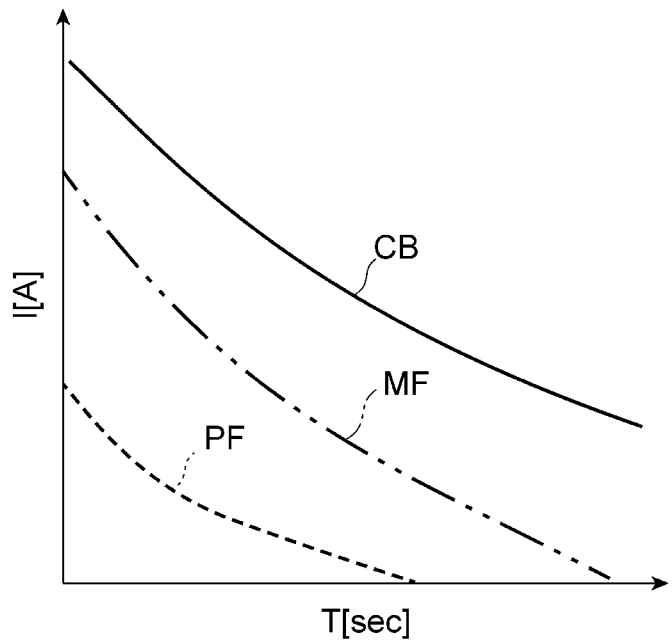
FIG. 2 is a graph showing the relationship between the current value I and the time T at the time of current interruption of a pack fuse, module fuses, and cell blocking portions of the battery pack shown in FIG. 1.
Figure 3:
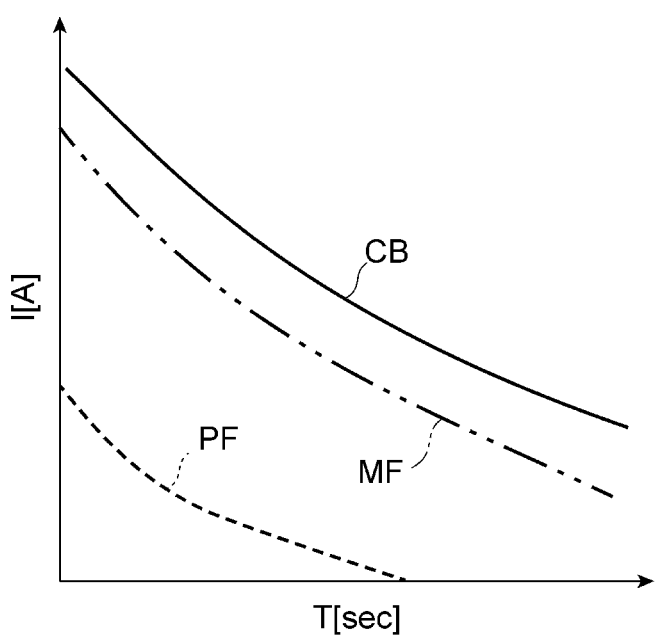
FIG. 3 is a graph showing the relationship between the current value I and the time T at the time of current interruption of a pack fuse, module fuses, and cell blocking portions of the battery pack shown in FIG. 1.

FIG. 1 is a schematic circuit diagram of battery modules BM and a battery pack BP including these battery modules according to one embodiment of the present disclosure. FIGS. 2 and 3 are graphs showing the relationship between the current value I and the time T at the time of current interruption of a pack fuse PF, module fuses MF, and cell blocking portions CB of the battery pack BP shown in FIG. 1. FIGS. 2 and 3 indicate the relationships between the current value I and the time T at the time of current interruption of the pack fuse PF, the module fuses MF, and the cell blocking portions CB with the broken line, the alternate long and two short dashes line, and the solid line, respectively.

The battery module BM and the battery pack BP of the present embodiment are mounted on a vehicle, such as an electric vehicle (EV) or a hybrid vehicle (HV), and makes up an in-vehicle power storage system that stores the supplied electric energy and supply the stored electric energy to electric devices of the vehicle. Although the details will be described later, the battery pack BP and the battery module BM of the present embodiment have the following configuration as the main features.

Each battery module BM includes a plurality of battery cells BC, cell blocking portions CB, a pair of module terminals MT, and a module fuse MF. Each cell blocking portion CB is in a current path inside the corresponding battery cell BC, and interrupts the current path when a current of a predetermined value or higher flows through the current path. The pair of module terminals MT is connected to the plurality of battery cells BC. The module fuse MF is connected in series to the pair of module terminals MT and the plurality of battery cells BC. As shown in FIGS. 2 and 3, the battery module BM is configured so that the current value at which the cell blocking portion CB interrupts the current path is larger than the current value at which the module fuse MF blows out.

The battery pack BP includes the battery modules BM and a pack fuse PF connected in series to the battery modules BM. Each battery module BM includes a plurality of battery cells BC, cell blocking portions CB, a pair of module terminals MT, and a module fuse MF. Each cell blocking portion CB is in a current path inside the corresponding battery cell BC, and interrupts the current path when a current of a predetermined value or higher flows through the current path. The pair of module terminals MT is connected to the plurality of battery cells BC. The module fuse MF is connected in series to the pair of module terminals MT and the plurality of battery cells BC. As shown in FIGS. 2 and 3, the battery pack BP is configured so that the current value at which the module fuse MF blows out is larger than the current value at which the pack fuse PF blows out, and so that the current value at which the cell blocking portion CB interrupts the current path is larger than the current value at which the module fuse MF blows out.

In one example, as shown in FIG. 3, the battery pack BP is configured so that the current value at which the module fuse MF blows out is larger than the average value of the current value at which the cell blocking portion CB interrupts the current path and the current value at which the pack fuse PF blows out. In one example, the battery pack BP includes a plurality of battery modules BM and a pack fuse PF connected in series to the plurality of battery modules BM. The following describes the configuration of the battery module BM and the battery pack BP of the present embodiment in detail.

Figure 4:
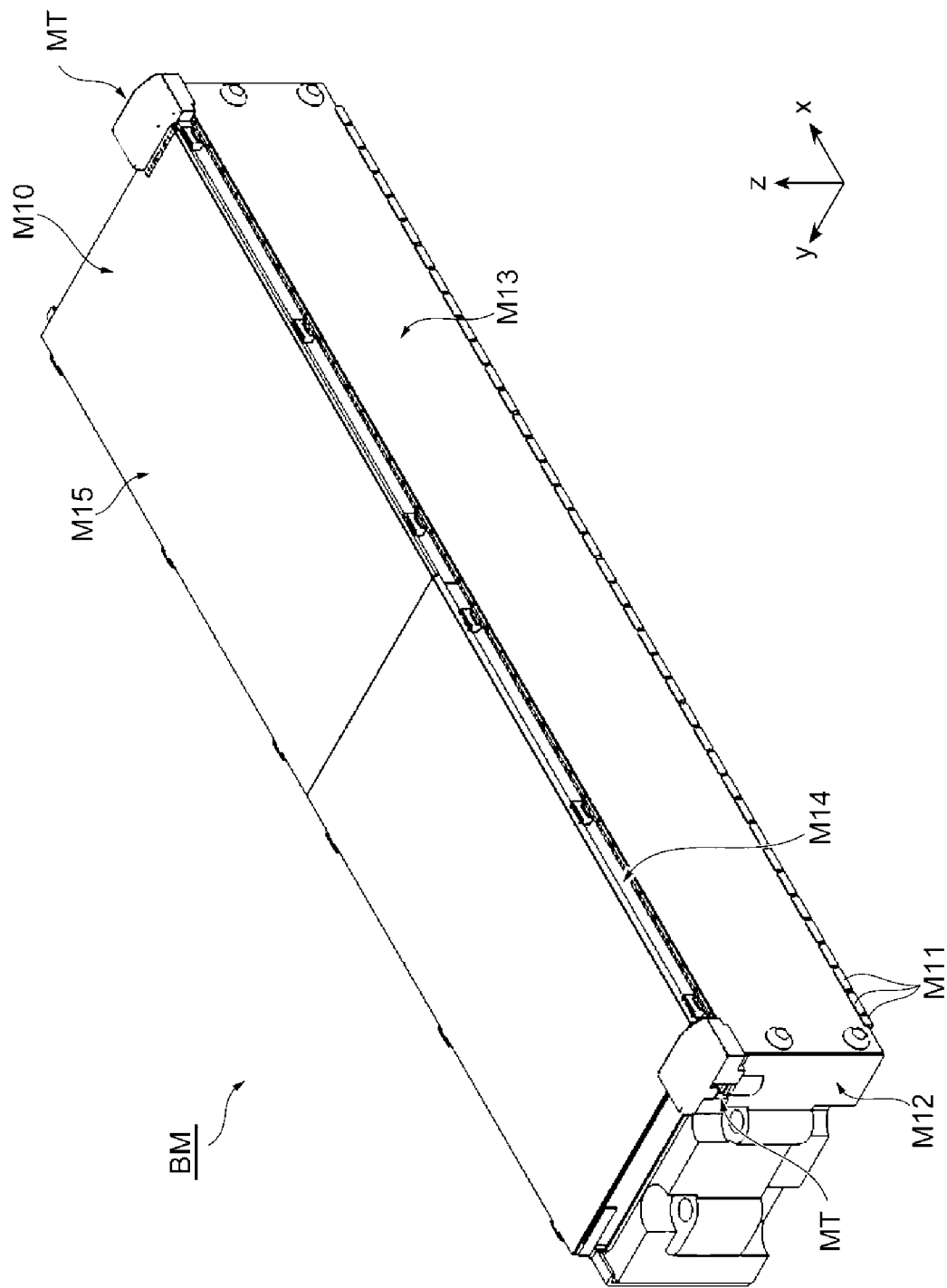
FIG. 4 is an external perspective view of a battery module according to one embodiment of the present disclosure.
Figure 5:
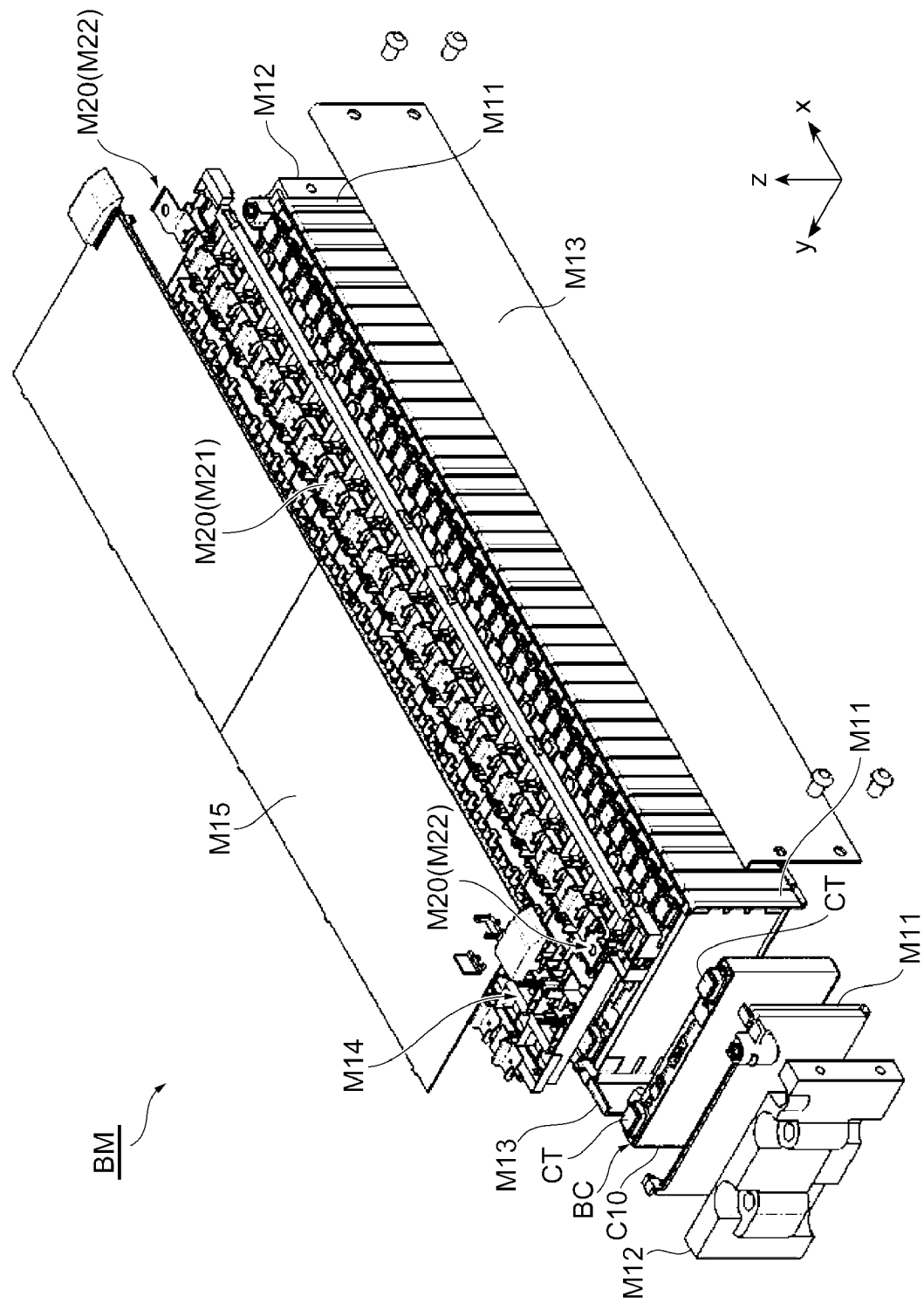
FIG. 5 is an exploded perspective view of the battery module in FIG. 4.

FIG. 4 is an external perspective view of the battery module BM according to one embodiment of the present disclosure. FIG. 5 is an exploded perspective view of the battery module BM in FIG. 4. In one example, the battery module BM has a substantially cuboid shape. The following may describe various parts of the battery module BM with reference to the rectangular coordinate system having the x-axis direction in the longitudinal direction, i.e., the length direction of the battery module BM, the y-axis direction in the width direction of the battery module BM, and the z-axis direction in the height direction of the battery module BM.

In one example, the battery module BM includes a housing M10, a plurality of battery cells BC, bus bars M20, a pair of module terminals MT, and an electronic circuit board not illustrated.

In one example, the housing M10 has a plurality of cell holders M11, a pair of end plates M12, a pair of side plates M13, an insulation cover M14, and a module cover M15.

In one example, the cell holders M11 are made of a resin material, such as polybutylene terephthalate (PBT). In one example, each cell holder M11 intervenes between mutually adjacent flattened rectangular battery cells BC stacked in the thickness direction (x-axis direction), so that the cell holders M11 hold the corresponding battery cell BC to sandwich it from both sides in the thickness direction. The cell holders M11 as a pair that are at both ends of the plurality of battery cells BC in the stacking direction (x-axis direction) each have screw holes to configure a pair of module terminals MT, which are external terminals of the battery module BM, for example.

In one example, the pair of end plates M12 includes plate members made of metal. The pair of end plates M12 is disposed at both ends of the plurality of battery cells BC via the pair of cell holders M11 disposed at both ends of the plurality of battery cells BC in the stacking direction (x-axis direction). The end plates M12 as a pair have their one faces that are opposed to sandwich the plurality of battery cells BC held at the cell holders M11. The other faces of the end plate M12 are directed to the outside that are on the other side relative to the battery cells BC, and have a cylindrical fixing part. In one example, the battery module BM is fixed to a structure, such as a vehicle, via bolts inserted through these fixing parts of the end plates M12.

The pair of side plates M13 is disposed at both ends of the battery module BM in the width direction (y-axis direction) via the cell holders M11. In one example, the side plates M13 as a pair are metal members each having a substantially rectangular shape, and are mutually opposed at both ends of the battery module BM in the width direction (y-axis direction). In one example, the side plates M13 as a pair are substantially oblongs, having the long-side direction, i.e., longitudinal direction in the length direction (x-axis direction) of the battery module BM and the short-side direction, i.e., transverse direction in the height direction (z-axis direction) of the battery module BM. The pair of side plates M13 are fastened at both ends in the longitudinal direction to the pair of end plates M12 by fasteners, such as rivets and bolts, and engage with recess-like grooves of the cell holders M11 at both ends in the transverse direction.

In one example, the insulation cover M14 is a plate member made of resin, such as PBT, having an electrical insulating property, and is opposed to the upper end face of the cell container C10 of each battery cell BC having the cell terminals CT. The insulation cover M14 has openings to expose the upper end faces of the cell terminals CT of the plurality of battery cells BC, and a partition wall for insulation between the cell terminals CT of the mutually adjacent cell blocking portions CB and between the mutually adjacent bus bars M20. In one example, the partition wall of the insulation cover M14 is disposed so as to surround the cell terminals CT of the battery cells BC and the bus bars M20. Various types of electric wiring are placed on the insulation cover M14 to connect to the battery cells BC and the electronic circuit board.

In one example, the electronic circuit board not shown is disposed between the insulation cover M14 and the module cover M15, i.e., on the other side of the insulation cover M14 relative to the battery cells BC in the height direction (z-axis direction) of the battery module BM. In one example, the electronic circuit board is connected to the bus bars M20 via insulated wire.

In one example, the module cover M15 is a plate member made of resin, such as PBT, having an electrical insulating property. The module cover M15 is disposed at the upper end of the housing M10 on the other side of the battery cells BC in the height direction (z-axis direction) of the housing M10 so as to cover the module cover M15 and the electronic circuit board. The module cover M15 has terminal covers at the positions corresponding to the module terminals MT at both ends of the plurality of battery cells BC in the stacking direction (x-axis direction), and the terminal covers cover the module terminals MT from the above. In one example, the module cover M15 is fixed to the upper part of the insulation cover M14 by engaging the hooks on the outer peripheral frame portion of the insulation cover M14 with the side edge of the module cover M15.

Figure 6:
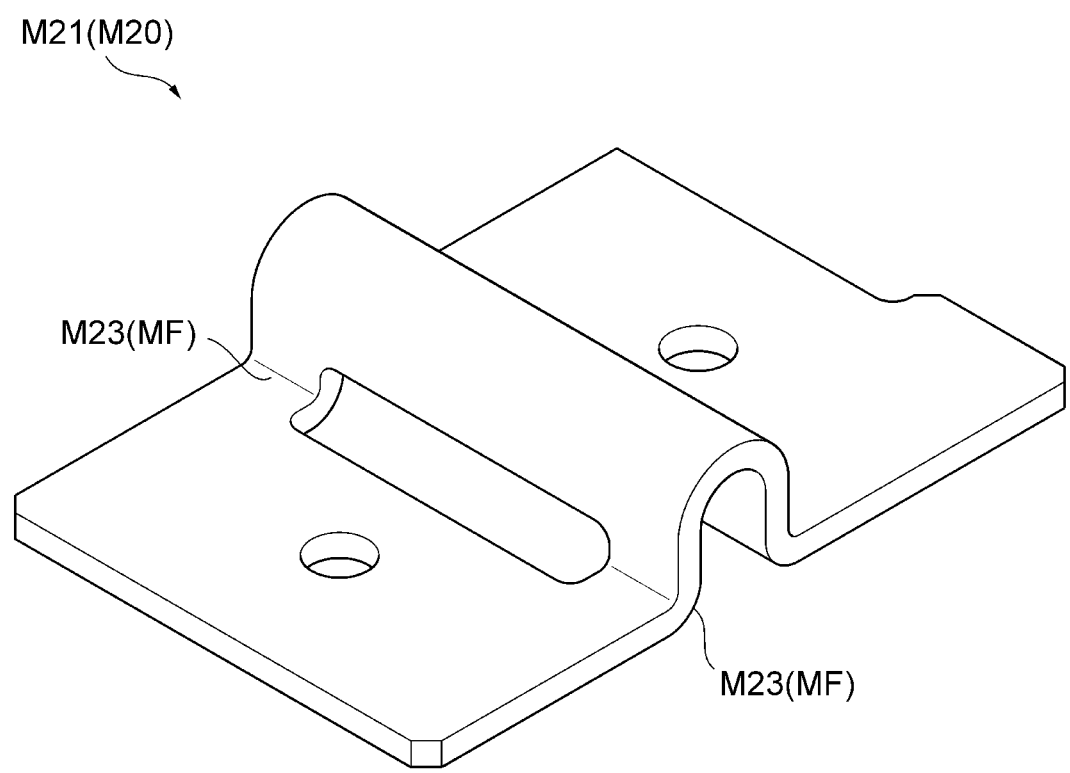
FIG. 6 is a perspective view of a bus bar connecting the battery cells of the battery module shown in FIG. 5.
Figure 7:
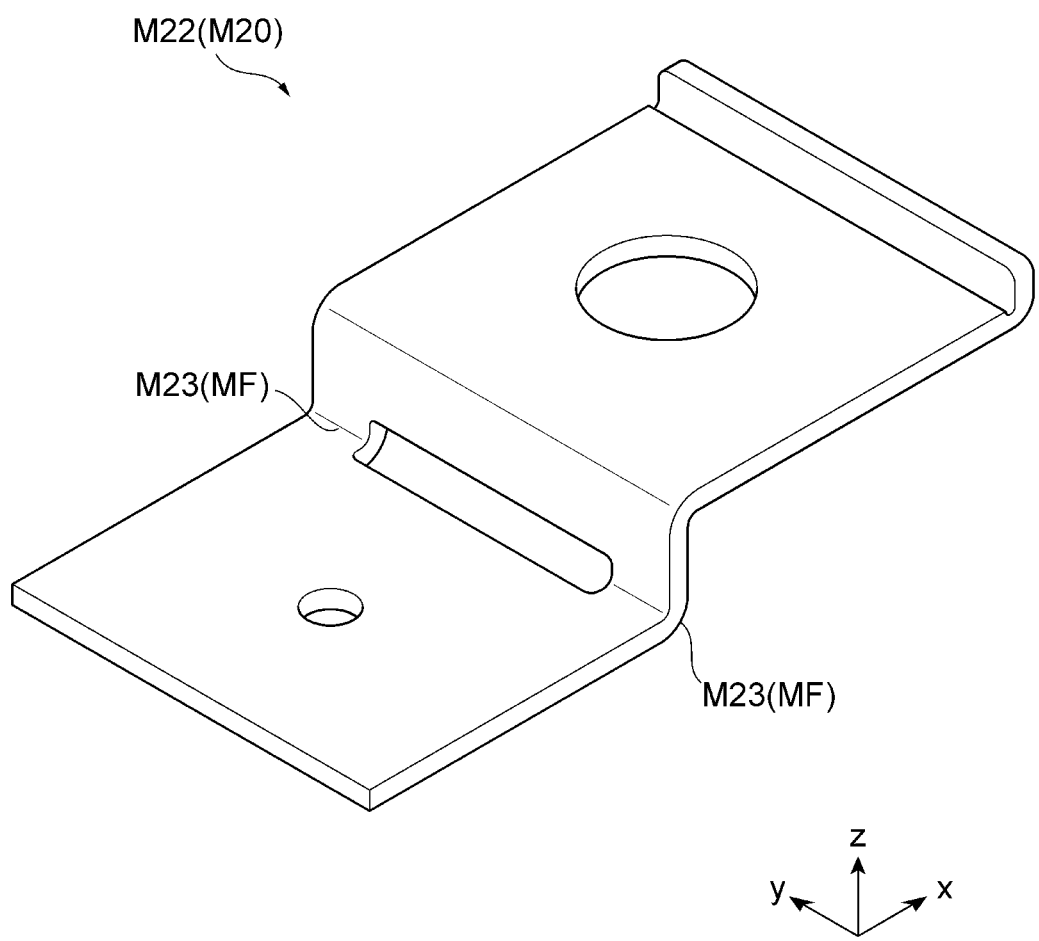
FIG. 7 is a perspective view of a bus bar making up a module terminal of the battery module in FIG. 4.

FIG. 6 is a perspective view of an intermediate bus bar M21 connecting the battery cells BC of the battery module BM shown in FIG. 5. FIG. 7 is a perspective view of an end bus bar M22 making up the module terminal MT of the battery module BM shown in FIG. 4. In one example, the bus bars M20 include a plurality of intermediate bus bars M21 and a pair of end bus bars M22. The bus bars M20 connect a plurality of battery cells BC and make up a pair of module terminals MT.

Specifically the intermediate bus bars M21 connect the plurality of battery cells BC, and are welded to the upper end faces of the cell terminals CT of battery cells BC that are exposed through the openings of the insulation cover M14, for example. In one example, these intermediate bus bars M21 each connect to the positive cell terminal CT of one of the corresponding mutually adjacent battery cells BC in the stacking direction and to the negative cell terminal CT of the other battery cell BC, so as to connect all of the battery cells BC in series.

In one example, the pair of end bus bars M22 connects to two battery cells BC at both ends in the stacking direction of the plurality of battery cells BC connected via the intermediate bus bars M21, and are welded to the positive cell terminal CT of one of the two battery cells and to the negative cell terminal CT of the other battery cell BC. In one example, the end bus bars M22 as a pair are fixed with bolts inserted through the screw holes of the pair of cell holders M11 disposed at both ends of the plurality of battery cells BC in the stacking direction (x-axis direction), to configure the pair of module terminals MT of the battery module BM.

In one example, each bus bar M20 includes a substantially rectangular metal plate having the longitudinal direction in the stacking direction (x-axis direction) of the plurality of battery cells BC and the transverse direction in the width direction (y-axis direction) of the battery cells BC, and this metal plate is bent in the height direction (z-axis direction) of the battery cells BC. In one example, the bus bar M20 has a narrow portion M23 having the smallest cross-sectional area along the transverse direction at an intermediate portion in the longitudinal direction, so as to configure a module fuse MF.

More specifically, in one example, the bus bar M20 has a slot extending in the transverse direction at a corner of a bend at a substantially right angle that is in the middle portion in the longitudinal direction, so as to define the narrow portion M23. The narrow portion M23 includes parts on both sides of the slot and has a smallest cross-sectional area along the transverse direction. That is, in one example, the module fuse MF of the battery module BM of the present embodiment is the narrow portion M23 of each of the bus bars M20 connecting to the cell terminals CT of the plurality of battery cells BC.

The narrow portion M23 having the smallest cross-sectional area along the transverse direction of the bus bar M20 is not limited to the configuration disposed on both sides of the slot extending in the transverse direction. In another example, the narrow portion M23 of the bus bar M20 may be defined by forming a cut-out in the transverse direction at the middle portion in the longitudinal direction or forming a plurality of through holes in the transverse direction. The narrow portion M23 of the bus bar M20 making up the module fuse MF may be disposed at at least any one of the intermediate bus bars M21 and the end bus bars M22.

Figure 8:
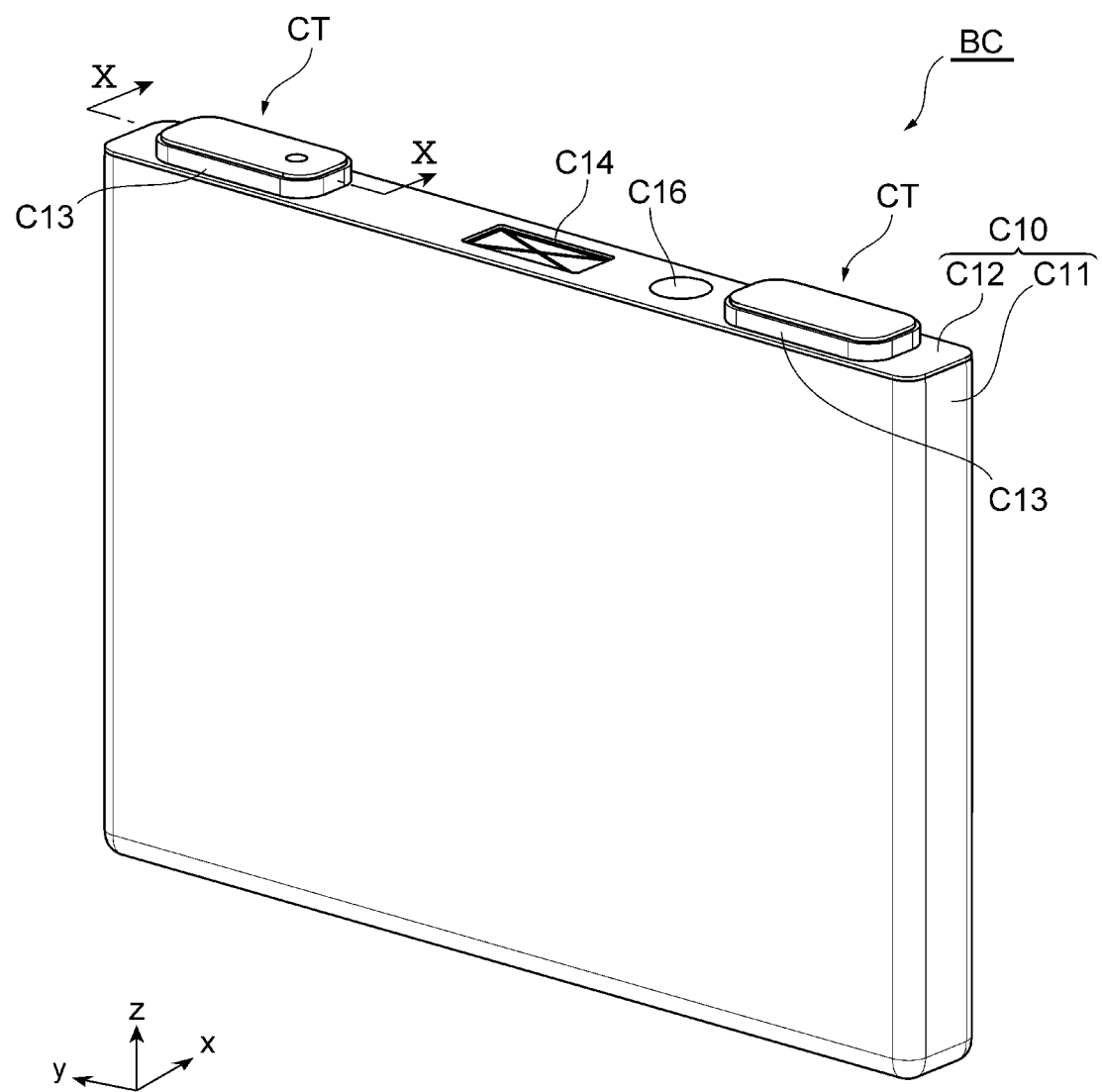
FIG. 8 is a perspective view of a battery cell making up the battery module shown in FIG. 5.
Figure 9:
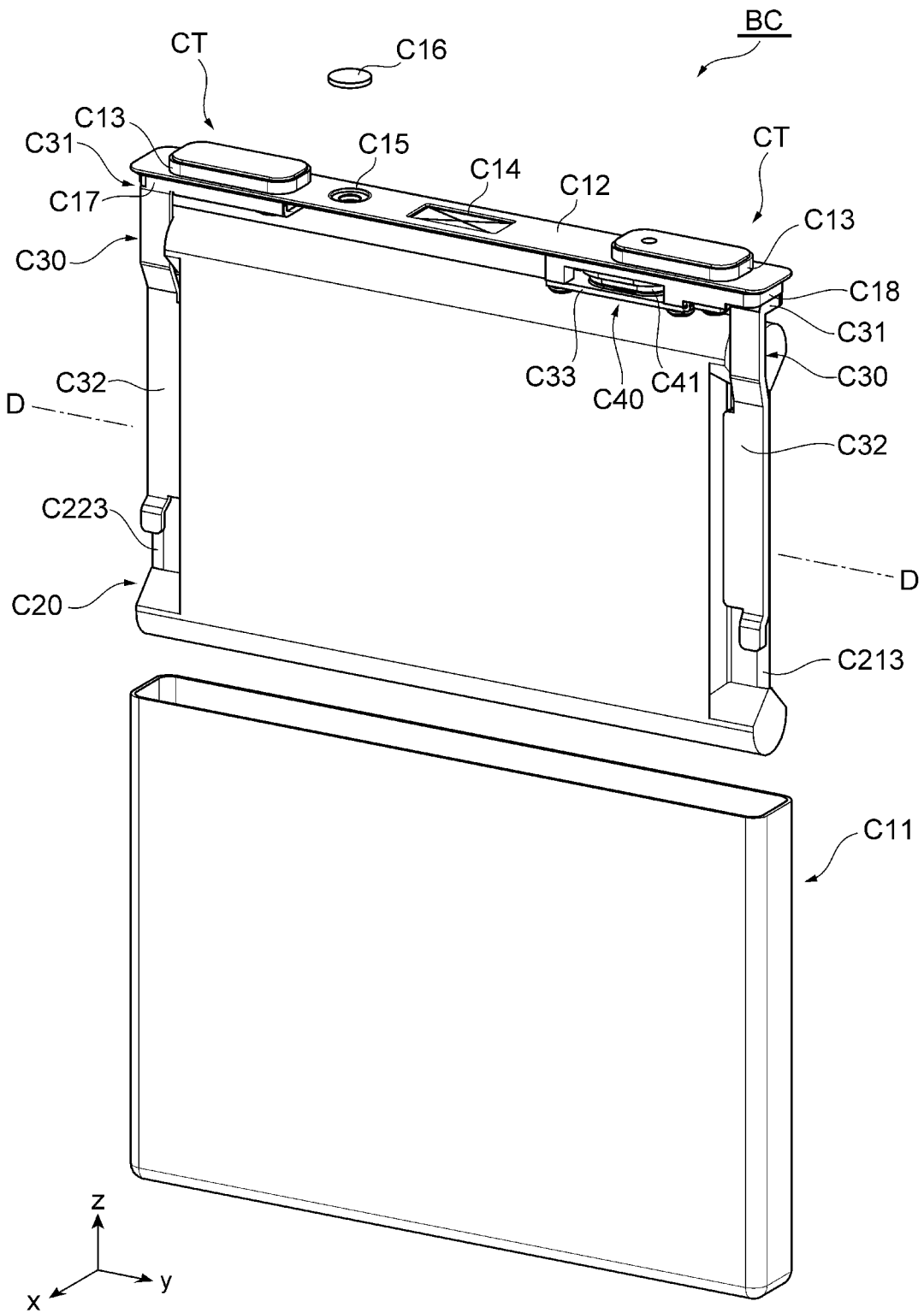
FIG. 9 is an exploded perspective view of the battery cell in FIG. 8.

FIG. 8 is a perspective view of a battery cell BC making up the battery module BM shown in FIG. 5. FIG. 9 is an exploded perspective view of the battery cell in FIG. 8. In one example, the battery cell BC includes a cell container C10, a storage element C20, a pair of cell terminals CT, a pair of connection terminals C30, and a current interruption valve C40.

The cell container C10 is a generally cuboid and flattened container, having a bottomed square tubular cell case C11 having an opening at the top and a rectangular plate-shaped cell lid C12 sealing the opening at the top of the cell case C11. In one example, the cell container C10 is made of a metal material, such as aluminum or an aluminum alloy.

The pair of cell terminals CT is placed on the outside of the cell container C10 at both ends of the upper face of the cell lid C12 in the width direction of the cell container C10, that is, in the longitudinal direction of the cell lid C12. A resin gasket C13 having an electrical insulating property is placed between each cell terminal CT and the cell lid C12, and so the cell terminal CT is electrically insulated from the cell lid C12.

In one example, the cell lid C12 has a gas release valve C14 and a filling port C15 between the pair of cell terminals CT. In one example, the gas release valve C14 is formed by thinning the cell lid C12 to form a groove-like slit. When the pressure inside the cell container C10 rises above a predetermined value, the gas release valve C14 opens to release the gas inside, and so reduces the pressure inside the cell container C10. The filling port C15 is for pouring a non-aqueous electrolyte into the cell container C10. In one example, a plug C16 may be welded there by laser welding for sealing of the filling port C15.

In one example, a pair of connection terminals C30 is fixed to a surface of the cell lid C12 facing the inside of the cell container C10 at both ends in the longitudinal direction of the cell lid C12 via insulating resin members C17 and C18 having an electric insulating property. The connection terminals C30 as a pair each have a base C31 fixed to the insulating member C17, C18 and facing the cell lid C12, and a terminal portion C32 extending from one end of the base C31 toward the bottom of the cell case C11. In one example, the cross-sectional area of at least one of the terminal portions C32 of the pair of connection terminals C30 may be locally reduced, and such a locally reduced part may function as a cell blocking portion CB as a cell fuse that blows out when a current of a predetermined current value or higher flows through the current path inside the battery cell BC.

Figure 10:
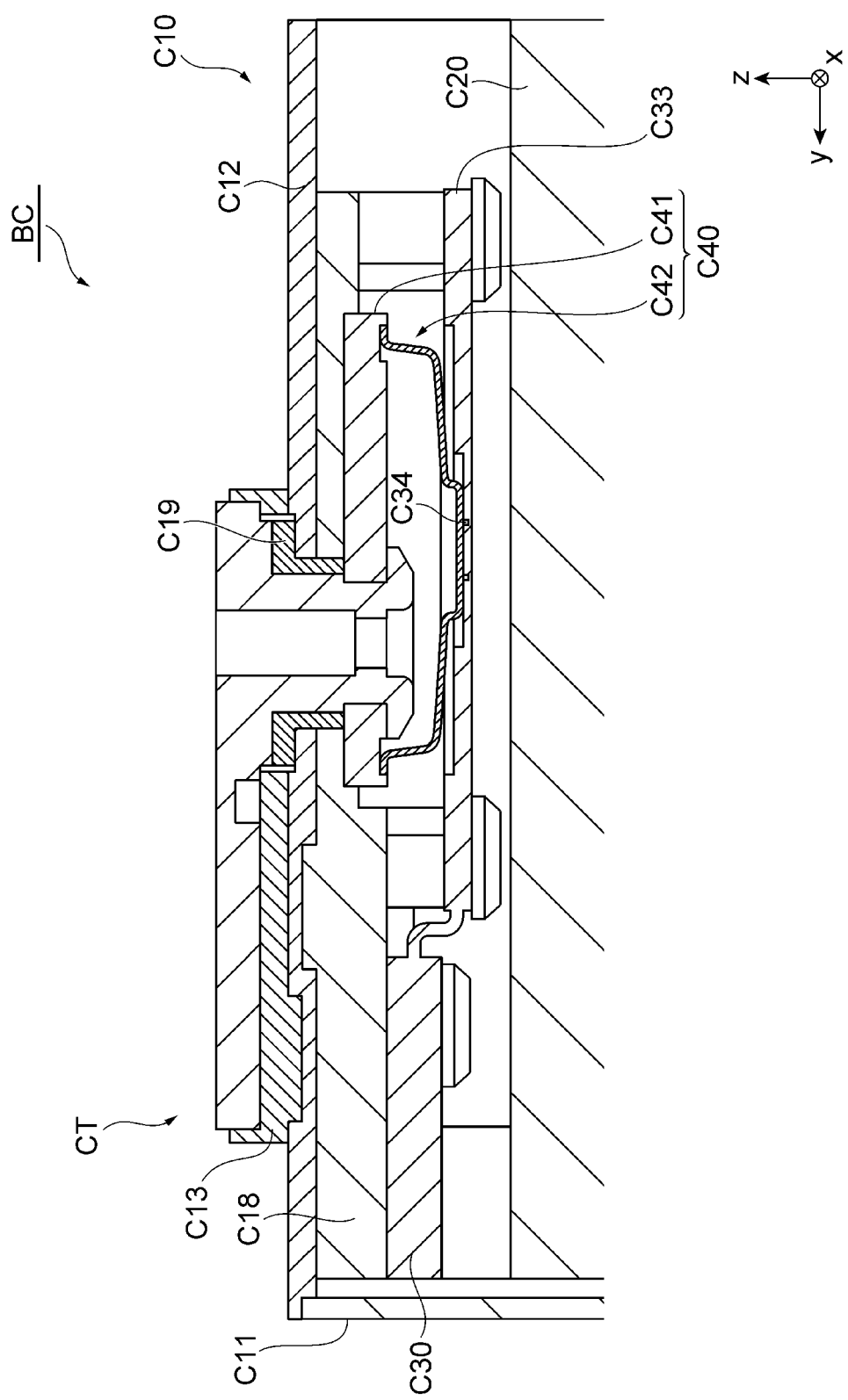
FIG. 10 is an enlarged cross-sectional view of the battery cell taken along the line X-X of FIG. 8.
Figure 11:
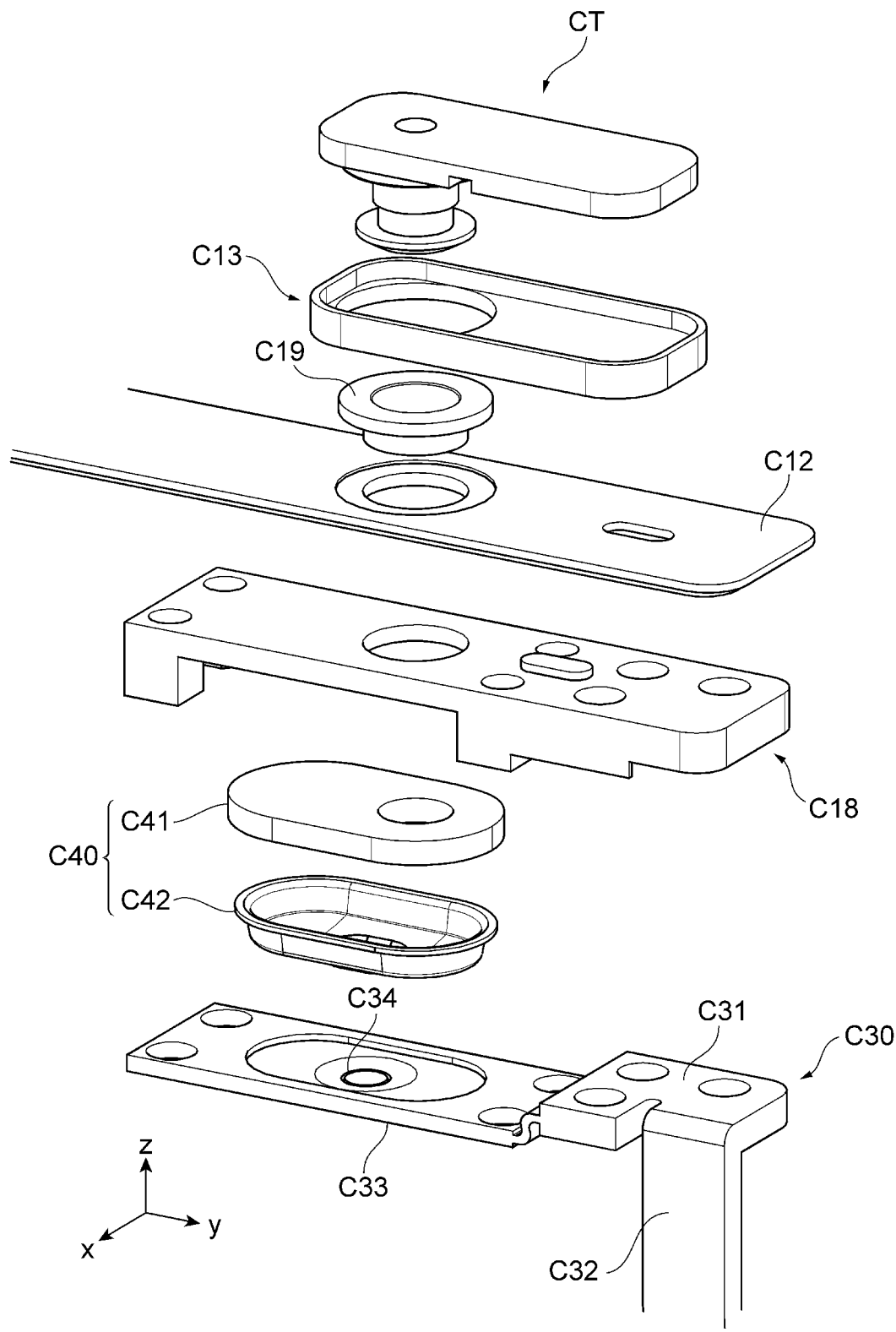
FIG. 11 is an exploded perspective view of a current interruption valve shown in FIG. 10.

FIG. 10 is an enlarged cross-sectional view of the battery cell taken along the line X-X of FIG. 8. FIG. 11 is an exploded perspective view of the current interruption valve C40 shown in FIG. 10.

In one example, the current interruption valve C40 is in a current path inside the corresponding battery cell BC, and is a cell blocking portion CB that interrupts the current path when a current of a predetermined value or higher flows through the current path. In one example, the current interruption valve C40 includes a conductive plate C41 and a diaphragm C42, and electrically connects the cell terminal CT and the connection terminal C30. The conductive plate C41 is an oval conductive plate member whose major axis direction is in the width direction (y-axis direction) of the battery cell BC, and is fixed to the cell lid C12 via the insulating member C18.

More specifically, the cell terminal CT has a cylindrical shaft that penetrates through a through hole of the cell lid C12 and a through hole of the conductive plate C41. The shaft of the cell terminal CT is inserted into a gasket C19 and so is electrically insulated from the cell lid C12. The shaft of the cell terminal CT is plastically deformed for swaging at the tip end to have an expanded diameter to fix the conductive plate C41 and the insulating member C18 to the cell lid C12 and to electrically connects to the conductive plate C41.

In one example, the connection terminal C30, which makes up a part of the current interruption valve C40, has a connection C33 connected to the base C31. The base C31 and the connection C33 are plate-shaped portions that are substantially parallel to the cell lid C12, and each has a plurality of through holes. In one example, the connection terminal C30 is fixed to the cell lid C12 via the insulating member C18 by inserting protrusions of the insulating member C18 into the through holes of the base C31 and the connection C33, and heating the tip ends of these protrusions to expand their diameters for thermal swaging. The face of the connection C33 of the connection terminal C30 facing the diaphragm C42 has a recess for accommodating a part of the diaphragm C42, and the recess has an annular groove C34 at the bottom.

The diaphragm C42 is a conductive metal member, and has a bowl shape having a depth in the height direction (z-axis direction) of the battery cell BC perpendicular to the cell lid C12. The center part of the bowl shape bulges toward the connection C33 of the connection terminal C30 from the peripheral edge. In one example, the portion at the center part of the diaphragm C42 bulging toward the connection C33 is bonded to the connection C33 by laser welding inside the annular groove C34 of the connection C33, and is electrically connected to the connection C30. The diaphragm C42 has a peripheral edge engaged with a groove of the conductive plate C41, and then is bonded to the conductive plate C41 over the entire circumference by laser welding, for example, to be electrically connected to the conductive plate C41.

As shown in FIG. 9, in one example, the current interruption valve C40 is placed in the current path between the positive cell terminal CT and the positive connection terminal C30. In this case, no current interruption valve C40 is placed between the negative cell terminal CT and the negative connection terminal C30. In this case, the shaft of the negative cell terminal CT is inserted into the through hole of the cell lid C12, the through hole of the insulating member C17, and the through hole of the base C31, and then is expanded at the tip end, so as to fix the negative connection terminal C30 to the cell lid C12 via the insulating member C17, and electrically connect the negative connection terminal C30 to the negative cell terminal CT.

Figure 12:
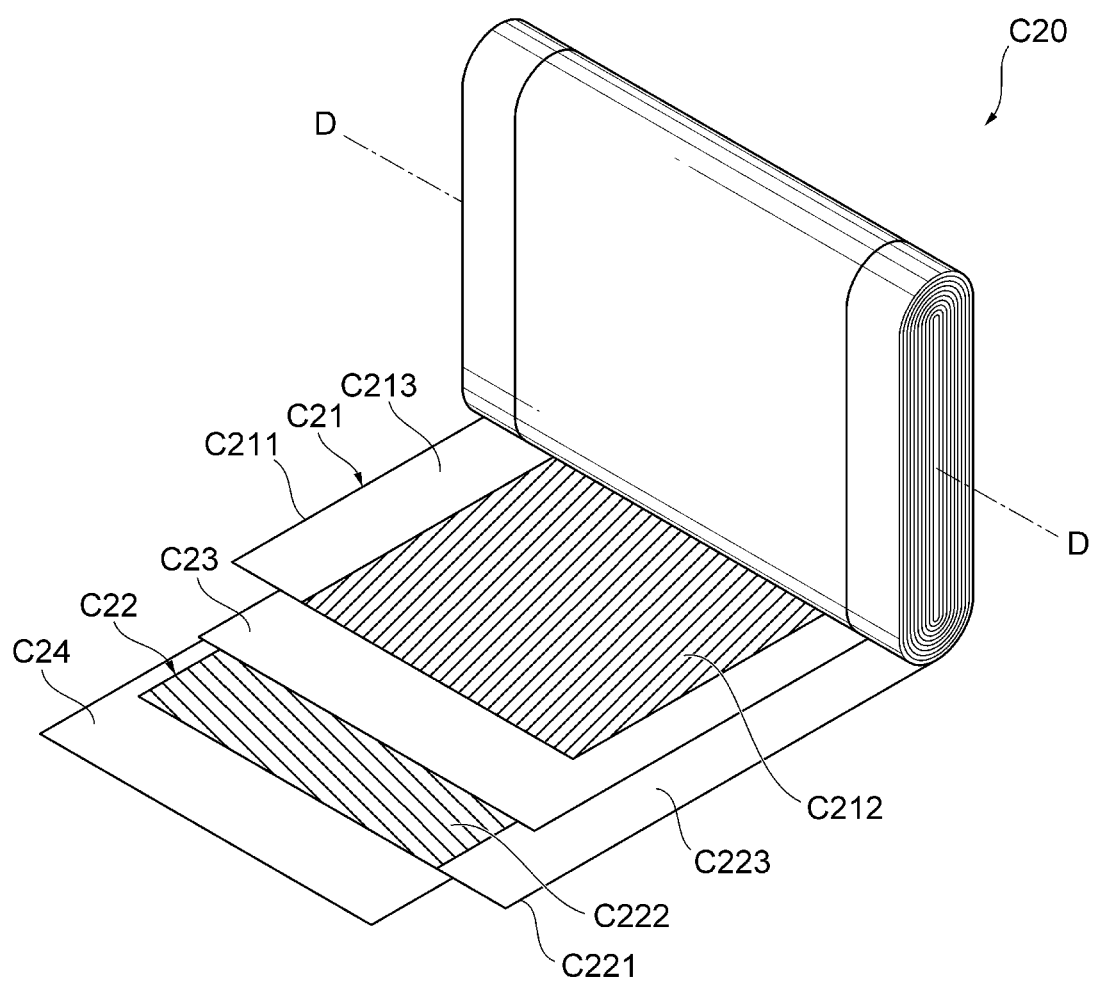
FIG. 12 is an exploded perspective view of a storage element of the battery cell shown in FIG. 9.

FIG. 12 is an exploded perspective view of the storage element C20 of the battery cell shown in FIG. 9. The storage element C20 is a wound electrode group prepared by stacking strip-shaped positive electrode C21, separator C23, negative electrode C22, and separator C24 and winding them around the winding axis D and shaping it as a flattened form. The separators C23 and C24 insulate between the positive electrode C21 and the negative electrode C22, and the separator C24 is also wound on the outside of the negative electrode C22 at the outermost circumference.

The positive electrode C21 has a positive-electrode foil C211 as a positive current collector, and a positive-electrode mixture layer C212 made of a positive-electrode active material mixture coated on both faces of the positive electrode C21. The positive-electrode mixture layer C212 is not formed on one side of the positive electrode C21 in the width direction, and this portion is a foil exposed portion C213 where the positive-electrode foil C211 is exposed. The positive electrode C21 is wound around the winding axis D while placing the foil exposed portion C213 on the opposite side of a foil exposed portion C223 of the negative electrode C22 in the winding-axis D direction.

The negative electrode C22 has a negative-electrode foil C221 as a negative current collector, and a negative-electrode mixture layer C222 made of a negative-electrode active material mixture coated on both faces of the negative electrode C221. The negative-electrode mixture layer C222 is not formed on one side of the negative electrode C22 in the width direction, and this portion is the foil exposed portion C223 where the negative-electrode foil C221 is exposed. The negative electrode C22 is wound around the winding axis D while placing the foil exposed portion C223 on the opposite side of the foil exposed portion C213 of the positive electrode C21 in the winding-axis D direction.

The foil exposed portions C213 and C223 of the positive electrode C21 and the negative electrode C22 are bundled at the flat portions of both ends of the storage element C20 in the winding axis D direction, and are bonded to the terminal portions C32 of the positive and negative connection terminals C30, respectively, shown in FIG. 9 by resistance welding or ultrasonic joining, for example. As a result, the cell terminals CT of the positive electrode and the negative electrode are electrically connected to the positive electrode C21 and the negative electrode C22 of the power storage element C20 via the connection terminals C30 of the positive electrode and the negative electrode, respectively.

The storage element C20 bonded to the terminal portions C32 of the connection terminals C30 and supported by the cell lid C12 is stored in the cell case C11 while inserting an insulating sheet (not shown) between the storage element C20 and the cell case C11. The opening of the cell case C11 is closed by the cell lid C12, and the entire circumference of the cell lid C12 is bonded to the opening of the cell case C11 by laser welding, for example. As a result, the opening of the cell lid C12 is sealed by the cell case C11 to obtain the cell container C10 including the cell lid C12 and the cell case C11. After that, a non-aqueous electrolyte is poured into the cell container C10 through the filling port C15 of the cell lid C12, and the plug C16 is bonded to the filling port C15 by laser welding, for example, for sealing, whereby the battery cell BC shown in FIG. 8 is obtained.

The following describes the operation of the battery module BM and the battery pack BP of the present embodiment.

As described above, the battery module BM and the battery pack BP of the present embodiment are mounted on a vehicle, such as an EV or a HV, and stores the supplied electric energy and supplies the stored electric energy to electric devices, such as a motor, of the vehicle. That is, as shown in FIG. 1, the battery pack BP is connected to an electric load EL, such as a motor.

As described above, the battery pack BP of the present embodiment includes the battery modules BM and the pack fuse PF connected in series to the battery modules BM. The battery modules BM and the battery pack BP of the present embodiment have the following configuration as the features. Each battery module BM includes a plurality of battery cells BC, cell blocking portions CB, and a module fuse MF. Each cell blocking portion CB is in a current path inside the corresponding battery cell BC, and interrupts the current path when a current of a predetermined value or higher flows through the current path. The module fuse MF is connected in series to a pair of module terminals MT connected to a plurality of battery cells BC and to the pair of module terminals MTs and the plurality of battery cells BC. The battery pack BP is configured so that the current value at which the module fuses MF blow out is larger than the current value at which the pack fuse PF blows out, and the current value at which the cell blocking portions CB interrupt the current paths inside the battery cells BC is larger than the current value at which the module fuses MF blow out.

With this configuration, if short-circuit of the electrical load EL causes a current exceeding the rating to flow through the battery pack BP, the pack fuse PF blows out at a low current value in a shorter time than the module fuses MF or the cell blocking portions CB to interrupt the current as shown in FIG. 2 or FIG. 3. This configuration reduces blowout of the module fuses MF and interruption of the current by the cell blocking portion CB, and so the battery modules BM and the battery pack BP have more improved safety than the conventional ones. The battery cells BC also can be protected more reliably.

The battery pack BP of the present embodiment includes a plurality of battery modules BM. The pack fuse PF is connected in series to the plurality of battery modules BM. This configuration allows the pack fuse PF to interrupt the current path between the electrical load EL and the plurality of battery modules BM.

If short-circuit of a pair of module terminals MT of one of the battery modules BM causes a current exceeding the rating to flow through the battery module BM, the module fuse MF blows out at a low current value in a shorter time than the cell blocking portions CB to interrupt the current as shown in FIG. 2 or FIG. 3. This configuration reduces interruption of the current by the cell blocking portions CB, and so the battery modules BM and the battery pack BP have more improved safety than the conventional ones, and the battery cells BC also can be protected more reliably.

The module fuse MF is in each of the bus bars M20 connecting to the cell terminals CT of the plurality of battery cells BC in the above example, and in this case, the module fuse MF that is a narrow portion M23 of the bas bar M20 as shown in FIG. 6 or FIG. 7 blows out. If a current exceeding the rating flows through the battery module BM, this configuration enables reliable interruption of the current with a simple configuration.

If an external short-circuit or an internal short-circuit of a battery cell BC causes a current exceeding the rating to flow through the battery cell BC, the cell blocking portion CB interrupts the internal current path of the battery cell BC and so keeps the safety of the battery cell BC. This means that the battery modules BM and the battery pack BP have more improved safety than the conventional ones, and the battery cells BC can be protected more reliably.

As described above, each of the battery cells BC making up the battery module BM includes the cell container C10, the storage element C20 stored in the cell container C10, the pair of cell terminals CT placed outside the cell container C10, and the pair of connection terminals C30 that electrically connects the pair of cell terminals CT to the storage element C20. In the battery modules BM, each of the cell blocking portion CB is placed between a cell terminal CT and a connection terminal C30, and is the current interruption valve C40 configured to interrupt the current path between the cell terminal CT and the connection terminal C30 in response to an increase in the internal pressure of the cell container C10.

In this case, if an external short-circuit or an internal short-circuit of the battery cell BC causes a current exceeding the rating to flow through the battery cell BC, the internal pressure of the cell container C10 increases, and so a pressure acting on the diaphragm C42 of the current interruption valve C40 increases. Then, if the internal pressure of the cell container C10 exceeds a predetermined pressure, the convex diaphragm C42 facing the inside of the cell container C10 is deformed to buckle toward the cell lid C12.

The top of the convex diaphragm C42, that is, the center portion of the diaphragm C42 that bulges toward the connection C33 of the connection terminal C30, is bonded to the inside of the annular groove C34 that is the portion thinned by the recess of the connection C33 of the connection terminal C30. When the convex diaphragm C42 is deformed to buckle toward the cell lid C12, stress is concentrated on the annular groove C34, and the thinned portion of the connection C33 is cut at the annular groove C34, so that the current path between the diaphragm C42 and the connection terminal C30 is cut off.

In this way, the current interruption valve C40 is placed in the current path inside the battery cell BC, and if a current of a predetermined current value or higher flows through the current path, the current interruption valve C40 interrupts the current path. When the cell blocking portion CB of the battery module BM is a narrow portion of the terminal C32 of the connection terminal C30, a current exceeding the rating flowing through the battery cell BC blows out this narrow portion of the terminal C32 of the connection terminal C30. That is, the narrow portion of the terminal C32 is placed in the current path inside the battery cell BC, and if a current of a predetermined current value or higher flows through the current path, this configuration interrupts the current path.

In one example, as shown in FIG. 3, the battery pack BP is configured so that the current value at which the module fuse MF blows out is larger than the average value of the current value at which the cell blocking portion CB interrupts the current path inside the battery cell BC and the current value at which the pack fuse PF blows out. This configuration reduces blowout of the module fuse MF or the interruption of the current by the cell blocking portion CB before blowout of the pack fuse PF more reliably. This improves the robustness of the battery pack BP, and so improves the reliability of the battery pack BP.

As described above, the present embodiment provides a battery module BM having more improved safety than the conventional battery pack and capable of protecting the battery cells BC more reliably, and provides a battery pack BP including the battery module BM.

That is a detailed description of the embodiments of the present invention with reference to the drawings. The specific configuration of the present invention is not limited to the above-stated embodiments, and the design may be modified variously without departing from the spirits of the present invention. The present invention also covers such modified embodiments.

REFERENCE SIGNS LIST

BC Battery cell
BM Battery module
BP Battery pack
C10 Cell container

C20 Storage element
C30 Connection terminal
C40 Current interruption valve
CB Cell blocking portion
CT Cell terminal
MF Module fuse
MT Module terminal
PF Pack fuse

The invention claimed is:

1. A battery module comprising:
   a plurality of battery cells;
   a cell blocking portion in a current path inside each of the plurality of battery cells, the cell blocking portion being configured to interrupt the current path in response to a current of a predetermined current value or higher flowing through the current path;
   a pair of module terminals connected to the plurality of battery cells;
   a bus bar including a hole extending in a transverse direction at a corner of a bend in the bus bar, and having a narrow portion on each side of the hole; and
   a module fuse connected in series to the pair of module terminals and the plurality of battery cells, the module fuse being the narrow portion,
   wherein a current value at which the module fuse blows out is larger than an average value of a current value at which the cell blocking portion interrupts the current path and the current value at which a pack fuse blows out.

2. The battery module according to claim 1, wherein the module fuse is in the bus bar connected to cell terminals of each of the plurality of battery cells.

3. The battery module according to claim 1, wherein each battery cell includes a cell container, a storage element stored in the cell container, a pair of cell terminals positioned outside the cell container, and a connection terminal that electrically connects the pair of cell terminals to the storage element, and
   the cell blocking portion is placed between one of the pair of cell terminals and the connection terminal, and includes a current interruption valve configured to interrupt the current path between the cell terminal and the connection terminal in response to an increase in internal pressure of the cell container.

4. The battery module according to claim 1, wherein the pack fuse is connected in series to the battery module.

5. The battery module according to claim 1, further comprising an end bus bar, the end bus bar being a different shape than the bus bar.

6. The battery module according to claim 1, further comprising
   an end bus bar, and
   wherein the end bus bar has one section of the bus bar is at one height and an other section of the bus bar is at a different height.

7. The battery module according to claim 6, wherein in between the one section and the other section, a second hole extends in a transverse direction at a corner of a bend.

8. A battery pack comprising:
   at least one battery module; and
   a pack fuse connected in series to the at least one battery module;
   the at least one battery module including: a plurality of battery cells; a cell blocking portion in a current path inside each of the plurality of battery cells, the cell blocking portion being configured to interrupt the current path in response to a current of a predetermined current value or higher flowing through the current path; a pair of module terminals connected to the plurality of battery cells; a bus bar including a hole extending in a transverse direction at a corner of a bend in the bus bar, and having a narrow portion on each side of the hole; and a module fuse connected in series to the pair of module terminals and the plurality of battery cells, the module fuse being the narrow portion,
   wherein a current value at which the module fuse blows out is larger than a current value at which the pack fuse blow out, and a current value at which the cell blocking portion interrupts the current path is larger than the current value at which the module fuse blows out.

9. The battery pack according to claim 8, wherein the current value at which the module fuse blows out is larger than an average value of the current value at which the cell blocking portion interrupts the current path and the current value at which the pack fuse blows out.

10. The battery pack according to claim 8, wherein the at least one battery module includes a plurality of battery modules, and
    the pack fuse is connected in series to the plurality of battery modules.

* * * * *